July 13, 1948.    S. COLMAN    2,445,022
COMPUTING SCALE
Filed March 30, 1945
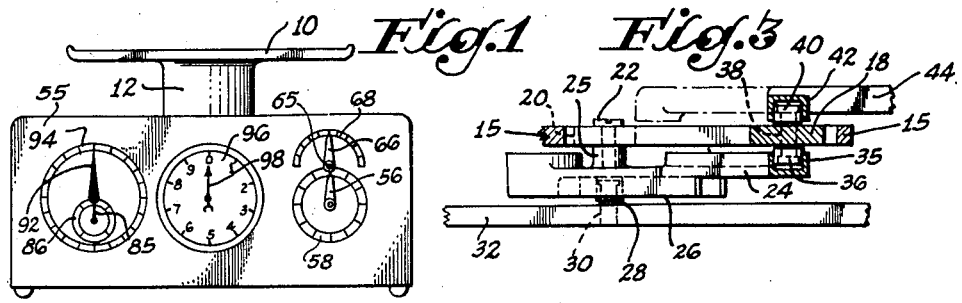
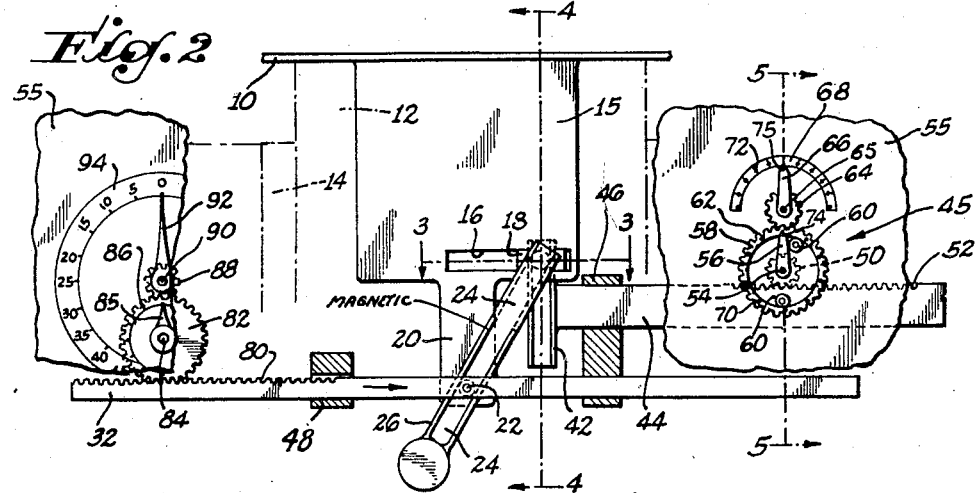
INVENTOR
SOL COLMAN
BY HARRIS, KIECH, FOSTER & HARRIS
FOR THE FIRM
ATTORNEYS Patented July 13, 1948

2,445,022

UNITED STATES PATENT OFFICE 2,445,022

COMPUTING SCALE

Sol Colman, Los Angeles, Calif.

Application March 30, 1945, Serial No. 585,789

4 Claims. (Cl. 265—29)

This invention relates to weighing scales, and particularly to scales provided with means for computing total value of goods being weighed.

A particular object of the present invention is to provide a scale structure adapted both to weigh articles placed thereon and to indicate the total value of only the particular article or articles being weighed, thereby making it unnecessary to select the total value from a series of total values representing different prices per unit.

A further object of this invention is to provide computing scales by means of which any selected price per unit may be set up manually, and whereby the total value of the goods on the scales at the selected unit price will be automatically indicated.

It is a still further object of this invention to provide computing scales by means of which the weight of an article being weighed may be indicated simultaneously with the indication of the total value thereof.

It is also an object to provide computing scales in which the unit price set up in the computing mechanism may be shown in such position as to be visible to the customer, in addition to making the total value visible to the customer.

A still further object is to provide mechanism for computing scales which will be relatively simple in construction and operation, positive in its indications, and not susceptible to easily getting out of order.

Other objects and features of the invention will become apparent to those skilled in the art upon reference to the following specification and accompanying drawing wherein one embodiment is disclosed by way of illustration.

In this drawing,

Fig. 1 is a front elevation of a platform scale embodying features of the present improvement;

Fig. 2 is an enlarged showing, partly in front elevation and partly in vertical section, parts being broken away to facilitate disclosure;

Fig. 3 is a cross-sectional detail, taken approximately on the line 3—3 of Fig. 2;

Fig. 4 is a vertical section, taken approximately on the line 4—4 of Fig. 2;

Fig. 5 is a vertical section, taken approximately on the line 5—5 of Fig. 2; and Fig. 6 is a diagrammatic detail of modified price indicating means.

In the drawing, there is illustrated a platform 10 of weighing scales of any conventional or preferred design which may include a vertically reciprocable pedestal 12 working in an appropriate housing 14 under the influence of the weight of objects being weighed on the platform 10.

Depending from and affixed to the under face of the platform 10 is a bracket 15 which is illustrated as being in the form of a plate in the lower end of which there is provided a horizontally disposed elongated slot 16 in which slot a block 18 is slidably positioned for operating adjustment therein. The platform 10, pedestal 12 and bracket 15 may be counterbalanced in any appropriate manner, as by the spring means schematically indicated at 19 in Fig. 4. Depending from the lower edge of the bracket 15 is a rigid finger 20 to which there is connected by a fixed pivot pin 22 an intermediate portion of a driving metering arm 24, having on one side a boss 25 receiving the pin 22. The side of the arm 24 opposite from the boss 25 and pivot pin 22 is provided with an elongated channel guide 26 which receives a roller 28 mounted on a fixed pivot 30 carried in a horizontally disposed rack bar 32 adapted to actuate total-value indicating mechanism. The upper portion of the driving metering arm 24 is provided on the side opposite from the channel guide 26 with a second channel guide 35 which receives a roller 36 mounted on a fixed pin 38 secured in the sliding block 18 and projecting from one side thereof so as to dispose the roller 36 in the second channel guide 35. The pin 38 also projects from the opposite side of the sliding block 18 and carries a roller 40 which travels in a vertically disposed channel guide 42 carried on the adjacent end of a rack bar 44 adapted to incorporate a unit value adjustment by way of means generally indicated at 45.

The rack bar 44 is mounted in an appropriate guiding support 46 through which it is adapted to slide as adjusted by the means 45. Similarly, the rack bar 32 also is slidably mounted at one end in the guiding support 46 and at its other end in a guiding support 48, these supports 46 and 48 being suitably carried by the scale housing 14.

The adjusting means 45 serves to accomplish adjustment of the rack bar 44 through the medium of a pinion gear 50 which engages with a rack 52 formed in the upper edge of the bar 44. The gear 50 is mounted upon a shaft 54 pivotally mounted in an adjacent wall 55 connected with or forming a part of the housing 14, and a setting arm 56 is fixed to the shaft 54 for operation of the gear 50 to adjust the rack bar 44 and its guide 42 in accordance with the position of the setting arm 56. The arm 56 is adapted to be moved into any one of ten positions indicated on a dial or scale carried on a dial ring 58, such ring being revolvably mounted on suitable retaining holders 60 serving as bearings and conveniently made in the form of flanged rollers carried on pins 61 on the wall 55. The dial ring 58 carries an external annular gear 62 which is meshed with a pinion gear 64 mounted upon a fixed pivot 65 also carried by the wall 55, this gear 64 being under the control of a second setting arm 66 which is adapted to be adjusted to any one of ten positions on an arcuate or approximately semi-circular scale 68 carried by the wall 55.

The setting positions on the dial ring 58 represent tens and the setting positions on the scale 68 represent units. The setting positions on the dial ring 58 and on the scale 68 are provided with detents 70 and 72, respectively, which are adapted to be engaged by movable position-retaining contacts 74 and 75, respectively, provided on the ends of the setting arms 56 and 66.

Thus, the setting of the arm 56 adjusts the rack bar 44 through the medium of the gear 50 on the rack 52 to incorporate a "tens" price factor, and setting of the arm 66 incorporates a "units" price factor by reason of the fact that adjustment of the arm 66 causes the pinion gear 64 to adjust the position of the dial ring 58 whereby the position of the "tens" setting arm 56 is correspondingly shifted, thereby correspondingly moving the pinion gear 50 and the rack bar 44.

Movement of the rack bar 44 correspondingly slides the block 18 in its slot 16 thereby imparting a given inclination to the metering arm 24 by corresponding movement about its pivot 22 on the finger 20 of bracket 15. Subsequent depression of the platform 10, the bracket 15 and the finger 20 by reason of the weight of an object on the platform 10 moves the totaling rack bar 32 to the right, as seen in Fig. 2, by driving action of the inclined channel guide 26 upon the roller 28. The upper edge of a corresponding portion of the rack bar 32 is provided with a rack 80 which is in engagement with a gear 82 suitably journaled in the wall 55 by means of a stub shaft 84 having a projecting outer end provided with an indicating pointer 85 adapted to cooperate with a "dollars" scale 86 on the outer face of the wall 55. The gear 82 is in mesh with a gear 88 journaled in the wall 55 by means of a stub shaft 90 which likewise carries an indicating pointer 92 cooperating with a "cents" scale 94 on the outer face of the wall 55. By means of the rack 80, the gears 82 and 88, and the pointers 85 and 92, the price total of the object being weighed is indicated on the scales 86 and 94 in accordance with the price per unit set up by the mechanism 45. The weight of the goods carried by the platform 10 may be indicated on a dial 96 carried on the outer face of the wall 55 as by means of a pointer 98 in any conventional or preferred manner.

If it be desired that the mechanism 45 for setting up the price per unit be operable from one side of the scale structure and that such price be indicated on the opposite side, the unit price indicating means 45 may be duplicated on a wall 55a or other member opposite from the wall 55. Or, as an alternative structure, the mechanism 45 described may be employed at one side of the scale structure and the detents 70 and 72 provided with contacts 100 and 101, respectively connected by suitable electric lead lines 102 to corresponding series of windows 103 and 104 arranged in elongated panels, as indicated in Fig. 6, the indicating arms 56 and 66 being suitably connected into the respective circuits by lead lines 105. In this manner individual lamps of the corresponding series will be selectively illuminated to indicate in the windows 103 and 104 the price per unit set up in the apparatus by the arms 56 and 66.

In order to eliminate variations due to any play between the roller 28 and the channel guide 26, the lower side of the guide 26 may be constructed of brass or other non-magnetic metal and the upper side of magnetized iron whereby to attract the roller 28 and maintain uniform engagement of the roller 28 with the magnetized side of the channel guide 26.

The functioning of the apparatus disclosed has been indicated in the above description. To recapitulate, the tens factor of the price per unit of goods to be weighed is set up in the device by corresponding adjustment of the setting arm 56 at the proper position so that the contact 74 engages in the corresponding detent 70, and the units factor of the price per unit of the goods is set up by selectively positioning the setting arm 66 in the respective detent 72, thereby shifting the dial ring 58 through the medium of the pinion gear 64 and the annular gear 62. This adjusting of the arms 56 and 66 correspondingly adjusts the sliding block 18 and the inclination of the metering arm 24. Upon placing an object upon the platform 10, the bracket 15 and its finger 20 are depressed, thereby depressing the metering arm 24 so that the channel guide 26 travels upon the roller 28 secured to the rack bar 32. This descent of the bracket 15 and the corresponding descent of the sliding block 18 and its roller 36 causes the metering arm 24 always to maintain a position parallel to its set position as it travels downward during the weighing operation. Movement of the other roller 40 carried by the block 18 is in the adjusting channel guide 42 on the rack bar 44 which insures maintenance of the proper relative position of the block 18 in the slot 16. Downward movement of the metering arm 24 during the weighing operation causes the upper inclined wall of the channel guide 26 to force the roller 28 and its rack bar 32 to the right, as seen in Fig. 2, thereby causing the rack 80 to rotate the gears 82 and 88 and thereby move the indicating pointers 85 and 92 along the scales 86 to 94 to indicate the total price.

The various gears and racks and the length of the metering arm 24 are so proportioned and the various scales are so calibrated, with respect to the vertical movement of the platform 10, bracket 15 and finger 20, that the setting up of any price unit per unit in the mechanism 45 causes a correct total price to be indicated on the total price scales 86 and 94. The movement of the "units" gear 64 by adjustment of the setting arm 66 along the arcuate scale 68 is on a 1:10 ratio with respect to movement of the annular gear 62 so that "units" are properly incorporated as well as "tens," which are set up by the setting arm 56 when adjusted along the scale on the ring 58. Since the movement of the rack bar 32 by the operation of the channel guide 26 on the roller 28 represents a straight line function regardless of the angle of the metering arm 24, calibration of the scales 86 and 94, as well as of scales 58 and 68, is simple.

Since numerous variations of the generic invention herein disclosed and claimed will become apparent to those skilled in the art, it is intended to cover all such modifications as may fall within the scope of the appended claims.

I claim as my invention:

1. In combination in computing scales: weight-movable means movable in accordance with the weight of an object being weighed; a pivot on said movable means; a metering arm mounted upon said pivot and bodily movable with said movable means, said arm being adjustable about said pivot to positions angularly disposed with respect to the direction of movement of said movable means; shiftable means on said movable means and adjustable in accordance with selected unit prices; a first guide roller carried by and projecting from said shiftable means; a first channel means carried by a portion of said metering arm and spaced from said pivot, said channel means receiving said guide roller to position said portion of said arm; movable unit-price means adjustable in accordance with unit price for adjusting said shiftable means; a second guide roller and a second channel means receiving said second roller and thereby operatively connecting said movable unit-price means with said shiftable means, whereby said shiftable means is positively moved in opposite directions by said movable unit-price means; and totaling means connected with said metering arm and actuable thereby upon movement of said weight-movable means.

2. A combination as in claim 1, including: a third channel means provided on said metering arm and spaced from said first channel means; a member for actuating said totaling means; and a roller on said member engaged in said third channel means, whereby to drive said totaling means from said metering arm.

3. A combination as in claim 1, including: a third channel means provided on said metering arm and spaced from said first channel means; a member for actuating said totaling means; and a roller on said member engaged in said third channel means, whereby to drive said totaling means from said metering arm, the last mentioned roller being of iron, and one side only of said third channel means being magnetic whereby to attract said iron roller to take up play.

4. A combination as in claim 1 wherein said totaling means includes a bodily shiftable member, and means providing a slidable and pivotal connection between said metering arm and said shiftable totaling member, the axis of such pivotal connection being aligned with the axis of said pivot mounting said arm.

SOL COLMAN.

REFERENCES CITED

The following references are of record in the file of this patent:

UNITED STATES PATENTS

| Number  | Name         | Date          |
|---------|--------------|---------------|
| 542,523 | Holden et al.| July 9, 1895  |
| 563,246 | Swift        | June 30, 1896 |
| 602,658 | Fuller       | Apr. 19, 1898 |
| 637,153 | Ozias        | Nov. 14, 1899 |
| 697,098 | Mefford      | Apr. 8, 1902  |
| 713,265 | Whitney      | Nov. 11, 1902 |